(12) United States Patent
Weber, Jr. et al.

(10) Patent No.: US 7,117,282 B1
(45) Date of Patent: Oct. 3, 2006

(54) METHOD AND APPARATUS FOR ACTIVE ISOLATION OF COMMUNICATIONS PORTS

(75) Inventors: John Robert Weber, Jr., Northport, NY (US); Carl Francis Scheuermann, Storybrook, NY (US)

(73) Assignee: DGI Creations, LLC, Raleigh, NC (US)

( * ) Notice: Subject to any disclaimer, the term of this patent is extended or adjusted under 35 U.S.C. 154(b) by 139 days.

(21) Appl. No.: 10/832,476

(22) Filed: Apr. 26, 2004

(51) Int. Cl.
*G06F 13/00* (2006.01)
*G06F 12/14* (2006.01)

(52) U.S. Cl. ............... 710/107; 710/108; 710/100; 710/14; 710/200

(58) Field of Classification Search ............. 710/200, 710/100–120
See application file for complete search history.

(56) References Cited

U.S. PATENT DOCUMENTS

| | | | | |
|---|---|---|---|---|
| 5,535,416 A | * | 7/1996 | Feeney et al. ............... 710/14 |
| 5,590,201 A | * | 12/1996 | Lo ............................. 370/257 |
| 5,748,870 A | * | 5/1998 | Tims et al. ..................... 714/4 |
| 5,774,354 A | * | 6/1998 | Ohta ............................. 700/2 |
| 6,122,073 A | * | 9/2000 | Miyasaka et al. ........... 358/434 |
| 6,598,106 B1 | * | 7/2003 | Grieshaber et al. ......... 710/305 |
| 6,938,114 B1 | * | 8/2005 | Foster et al. ................ 710/200 |

* cited by examiner

*Primary Examiner*—Rehana Perveen
*Assistant Examiner*—Brian Misiura
(74) *Attorney, Agent, or Firm*—A. Jose Cortina; Daniels Daniels & Verdonik, P.A.

(57) ABSTRACT

A method and apparatus for isolating communications ports that allows access to a communications system for status and/or maintenance purposes via one communications port while preventing access to same system via the other remaining communications ports are disclosed. The isolation is achieved by an active isolation circuit that precludes a communication with the communication system as long as a signal generated by that communication system indicates that the port should be actively isolated. One preferred embodiment uses the Data Terminal Ready (DTR) signal as an input to the active isolation circuit to actively isolate the selected communication ports. This abstract is provided as a tool for those searching for relevant disclosures, and not as a limitation on the scope of the claims.

7 Claims, 4 Drawing Sheets

METHOD AND APPARATUS FOR ACTIVE ISOLATION OF COMMUNICATIONS PORTS

FIELD OF THE INVENTION

This invention relates to communications systems and methods, in particular, to the communications ports and methods for isolating communication ports.

BACKGROUND OF THE INVENTION

In many applications, communications systems are equipped with more than one communications port to allow data to be transferred either to or from the communications system. FIG. 1 illustrates a representative communications system 104 with four (4) communications ports (COM1 108, COM2 112, COM3 116, and COM4 120). Note that COM2, COM3, and COM4 are not shown in detail, as they have the same configuration as COM1. Ports COM1–COM4 allow the use of different communications mediums (for example, modems, frame relays, modbus, SCADA). The purpose of multiple ports is to allow simultaneous access to the communication system by more than one user. These users can either input data to the communications system 104 or obtain data from the communications system 104.

It is within the prior art to assert, a Data Terminal Ready ("DTR") signal by the Central Processing Unit (CPU) on to the communications ports via DTR1 (132), DTR2, DTR3, and DTR4. (DTR2–DTR4 not shown). In this way the DTR signal is passed to the user's communications device 180. This DTR signal indicates that the communication system 104 is ready for the connected user communication device 180 to read or write data to the communication system.

Typically, a communications system has an owner or administrator that is responsible for testing, maintaining, updating, or performing other administrative functions for the communications system. The administrator would use COM1 (108), COM2 (112), COM3 (116), or COM4 (120) to remotely access the communications system 104. Certain administrative tasks such as updating the communications system instruction set should be performed while the administrator has exclusive control of the communications system 104. One way to obtain exclusive control is to remove the communications system 104 from service or physically remove the communications connections from the other communications ports. For some applications it is not efficient or possible to physically isolate the communications system to gain exclusive control of the communications system for tasks such as an instruction update, periodic testing, or problem troubleshooting. For example, it is often not efficient or even possible to physically isolate a data acquisition system that aggregates and communicates measurements from remote or unmanned locations.

It is possible that while the administrator is performing administrator tasks, another user (User 1) can also access the communications system 104 through a communications port not being used by the administrator. Depending on the communications device 180 being used by User 1, it is possible for a connection to the communications system to be made even if a DTR signal 184 is not received by the communication device 180. Thus, the CPU 124 in the communication system may not be able to block incoming communication requests on the ports not being used by the administrator by merely withholding the DTR signal (such as DTR1 132 for COM1) from those other ports.

Depending on the activities that User 1 is performing within the communications system, the tasks being executed by the administrator may not function properly. Simultaneous access to the communications system by User 1 and the administrator during the execution of an administrative task requiring exclusive control of the communications system may cause the memory in the communications system to become corrupted and the communications system to malfunction. In addition, if User 1 is obtaining data while the administrator is performing administrator tasks, the data provided to User 1 may become corrupted and not be accurate. In some cases, the corruption to the data may be subtle so that it is not readily apparent that the data is unreliable.

SUMMARY OF THE DISCLOSURE

The present invention is directed to a modified communication system and a corresponding method that satisfies the need for effective affirmative isolation of communication ports to prevent violations of requested exclusive use of the device such as during the execution of certain administrator functions. Preventing violations of a requested session of exclusive use will prevent the above-identified problems. The present invention achieves an active isolation of the communications ports rather than relying on other external communication devices universally respecting a lack of a DTR signal as an indication not to use a port.

DETAILED DESCRIPTION OF THE DISCLOSED EMBODIMENT

The present invention will now be described more fully hereinafter with reference to the accompanying drawings, in which a preferred embodiment of the invention is shown.

Figure 2:
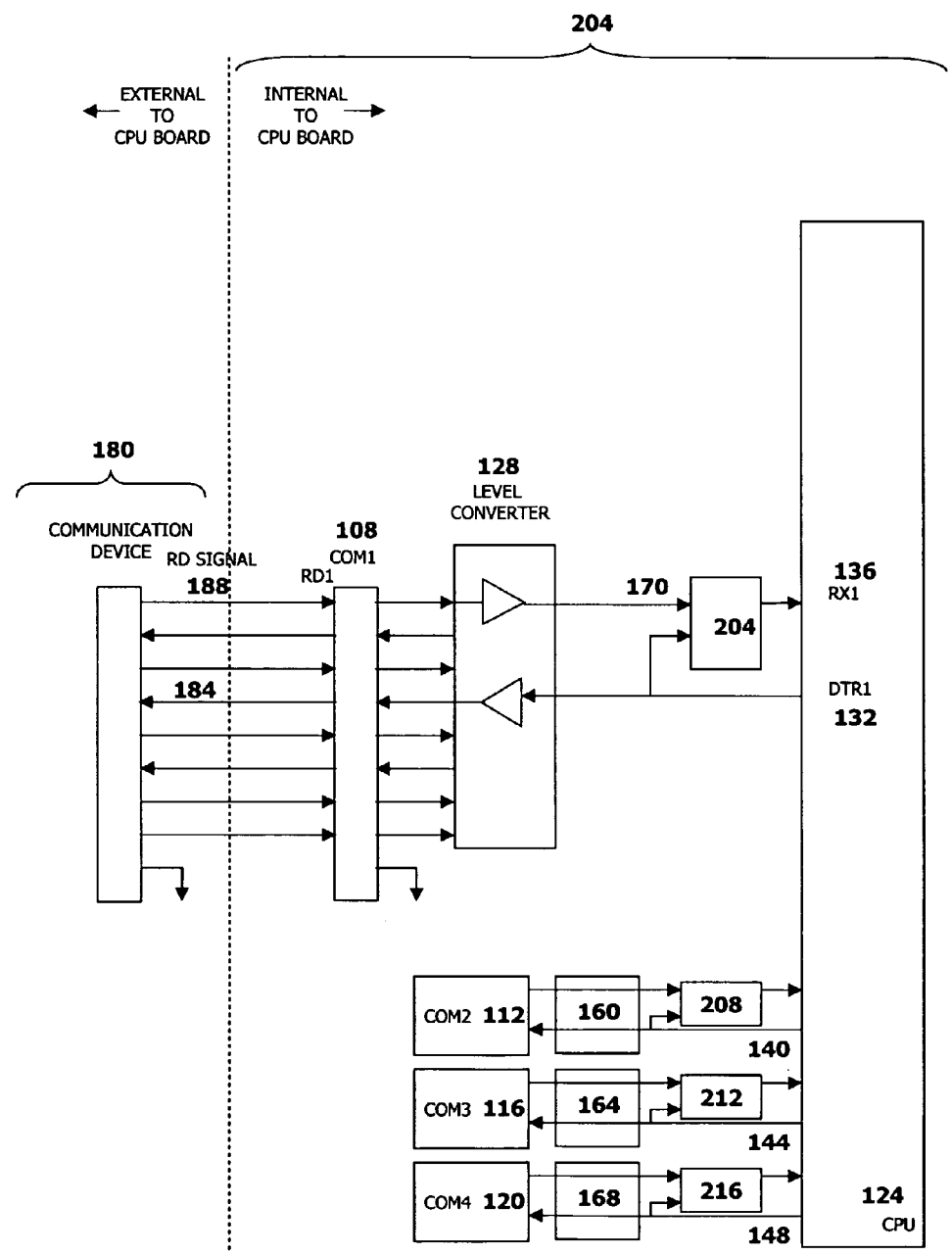
FIG. 2 shows the communications ports and CPU portion of a typical communications system with the addition of communications ports isolation circuitry.

FIG. 2 illustrates one embodiment of the present invention in a communications system 204 with four communication ports and active isolation circuits (204, 208, 212, and 216) that perform the active isolation of the communications ports. One portion of the isolation process is conventional. More specifically, the CPU 124 is instructed by the administrator communicating through one of the ports to remove the DTR signal (132, 140, 144, and 148) from the communications ports and associated circuitry not being used by the administrator. Any communications device attempting to connect to the communications system will not detect a DTR signal and should refrain from completing communicating through the port lacking a DTR signal. Any user that is communicating with the communications system at the time that the administrator initiates contact will be disconnected ("isolated") from the communications system as long as the user's equipment detects and acts upon the change in status of the DTR signal.

The present invention adds an additional level of isolation for a communications system's communications ports. This active isolation blocks other users from accessing the communications system at the same time that the administrator is performing tasks that require exclusive access. This extra measure of isolation is accomplished through the addition of active isolation circuits (204, 208, 212 and 216).

In FIG. 2, a set of active isolation circuits have been installed between the communication ports (108, 112, 116 and 120) and CPU 124. The active isolation circuits can be set to either allow or affirmatively prevent communications to occur through a particular communication port.

An external and remote user that wants to obtain data from the communications system 204 will initiate and maintain access to the communications system using some type of communications device that will generate a signal to the communications system requesting the requested data.

Figure 1:
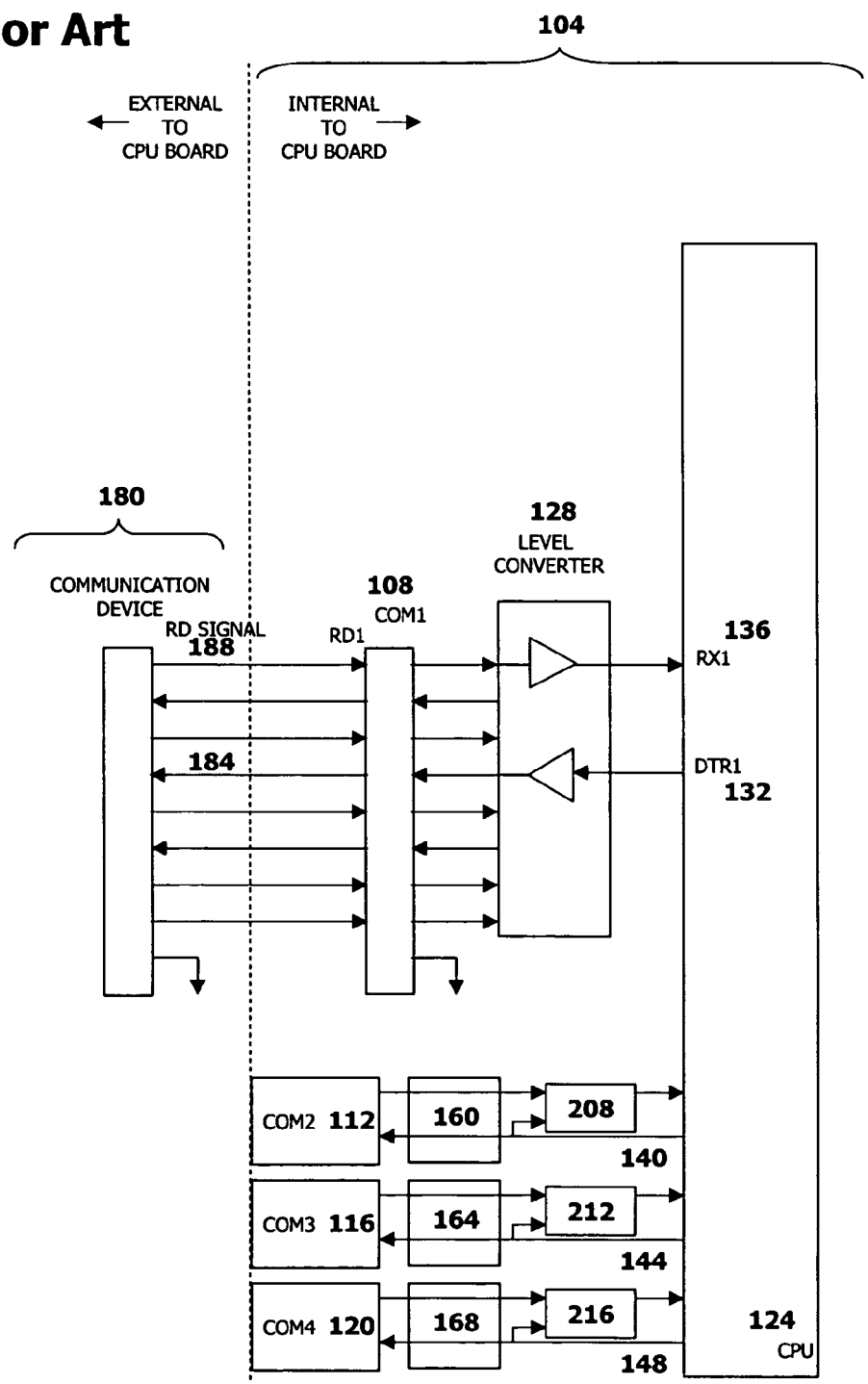
FIG. 1 shows the communications ports and CPU portion of a typical communications system as known in the prior art.

As illustrated in FIG. 1, the request for example, from the external communication device comes in the form of a Receive Data ("RD") signal 188. Such an RD signal will be applied to one of the four communication ports (COM1, COM2, COM3, and COM4) available for remote access (COM1, COM2, COM3, and COM4) via the RD1, RD2, RD3, or RD4 inputs to the respective communications ports.

In the prior art system such as shown in FIG. 1, the RD signal 188 will pass through the communications port 108 and then on to the CPU 124. Thus, the RD signal 188 passes through to the communication device CPU 124 and the only isolation comes from reliance on the external communication device 180 policing itself to not send RD requests unless the external communication device 180 senses a DTR signal 184 from the relevant communication port 108.

The addition of the active isolation circuit 204 is required because some user communication devices have the ability to communicate with the communications system even if a DTR signal is not asserted. This active isolation feature prevents the potential problems that could occur when a user is connected to the communications system with any communications device that does not monitor or honor the DTR status signal while the system administrator is performing communications system tasks that require exclusive access.

The active isolation feature is activated by the administrator via software instructions to the CPU 124 via the RD signal to the communications port the administrator is using. (For this example, assume it is COM2) Under normal operating conditions, the DTR signal, DTR1 signal 132 is asserted both on the communication port 108 as well as the communications port's active isolation circuit 204. When the DTR signal 132 is provided to the active isolation circuit 204, this allows any user to communicate with the communications system as they require. When the administrator requires exclusive access to the communications system to perform tasks, the administrator connects to the communications system as any remote user would via one of the available communications ports (for this example assume COM2).

Once the connection is complete, the administrator sends software instructions to CPU 124 to perform various tasks via the RD signal for COM2. The first portion of this instruction package will be a message that tells the CPU 124 to remove or not assert the DTR signal for each of the other communications ports (108, 116 and 120) and thus for the associated active isolation circuits (204, 212, and 216). Once the DTR signal is removed or not asserted from the communications ports and the associated active isolation circuits (204, 212, 216) other users will not be able to connect to the communications system 204 or if they were already connected, they will be disconnected.

Upon completion of the administrator's tasks and disconnection from the communications system 204 by the administrator, the CPU 124 will reassert the DTR signal to all the communications ports and the associated active isolation circuits. This returns the communications system 104 to a normal operating state.

The implementation of the isolation circuit can be accomplished in a variety of ways. In order to understand a typical implementation it is useful to discuss the operation of the level converters 128, 160, 164, and 168. These devices bridge the two sets of norms, the −12vdc to +12vdc norm on the COM port side of the device and the 0 to 5vdc norms on the CPU side of the device. As it is a norm that 0vdc coming or going to the CPU is considered data and 5vdc is considered no data, it is useful to review the following table of equivalency.

| State | Logical State | Value at CPU | Value at COM port |
|---|---|---|---|
| DTR asserted (indicates Data Terminal Ready) | DTR = True | 0 vdc | +12 vdc |
| DTR not asserted | DTR = False | 5 vdc | −12 vdc |
| RD conveying data (Receive Data signal) | Conveying a data value of 1 | 0 vdc | +12 vdc |
| RD conveying data | Conveying no data (data signal of 0) | 5 vdc | −12 vdc |

The desired operation of the active isolation circuit is as follows:

| DTR state | RD Signal from COM port after passing through level converter | RD Signal reaching CPU |
|---|---|---|
| Data Terminal Ready = True | Either high or low | Unchanged by Active Isolation Circuit |
| Data Terminal Ready = False | Either high or low | 5 vdc (no data) |

Figure 3:
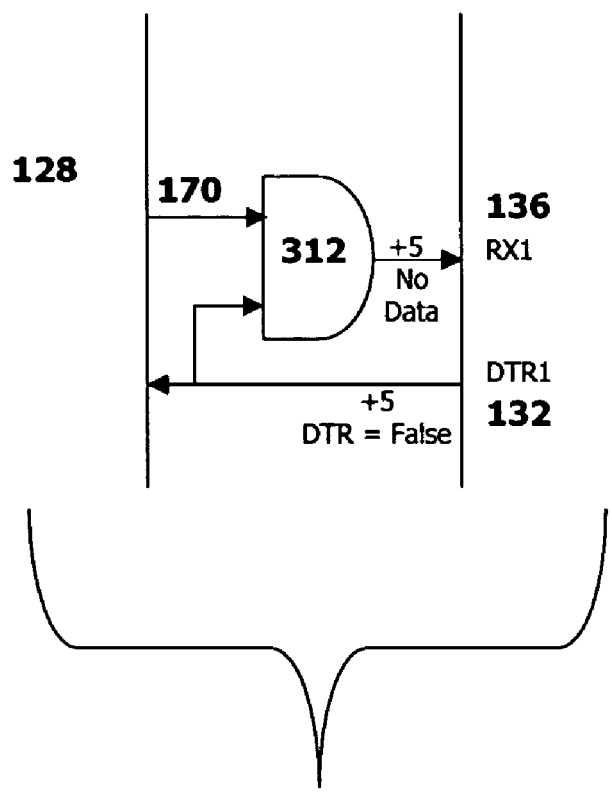
FIG. 3 illustrates one of the possible active isolation circuits that isolate a port based on a signal created at the communication system.

Turning now to FIG. 3, an example of suitable logic to perform active isolation is shown for the situation described above with respect to the particular components associated with COM1 108. FIG. 3 shows the active isolation circuit 204 and arrangement 304 which includes an OR gate 312 that combines RD signal 188 after the Level converter (now signal 170) and DTR1 132. Whenever DTR1 is not asserted (i.e. port not ready to receive a RD signal), DTR1 will have a value of 5vdc. This 5vdc will dominate the OR gate 312 and be fed to RX1 136 thus making RX1 136 immune or isolated from RD signal 188.

By requiring a signal to be asserted that is under the exclusive control of the CPU 124, the CPU 124 has the power to accept or block read requests.

One of ordinary skill in the art could modify active isolation circuit 204 to make various substations of logical elements to create another circuit that would isolate RX1 from the data on RD signal 188 after conversion to signal 170.

ALTERNATE EMBODIMENTS

The preferred embodiment uses the DTR signal (such as 132) controlled by the CPU 124 and already used to communicate to external communication devices (such as 180) the readiness of the CPU 124 to receive a read request. The invention could be adapted to use a signal under control of the CPU that is generated exclusively for the active isolation circuit and is not used to convey status to an external device.

The preferred embodiment uses an asserted (TRUE) state in order to allow a read request to make it through the active isolation circuit. One of ordinary skill in the art will recognize that the invention is not limited in that way. The invention could be implemented with an isolation signal that would affect the active isolation circuit to prevent a read signal from passing to the CPU 124 when the signal is asserted and allow a read signal to reach the CPU 124 when the isolation signal is not asserted. An example of this would include an isolation signal that runs from the CPU to each of the active isolation circuits. In an embodiment where only one communication port is designed for use for administrative functions that require exclusive use of the CPU, a single control line could be used to isolate all of the other ports by providing a common input to all of the active isolation circuits.

Figure 4:
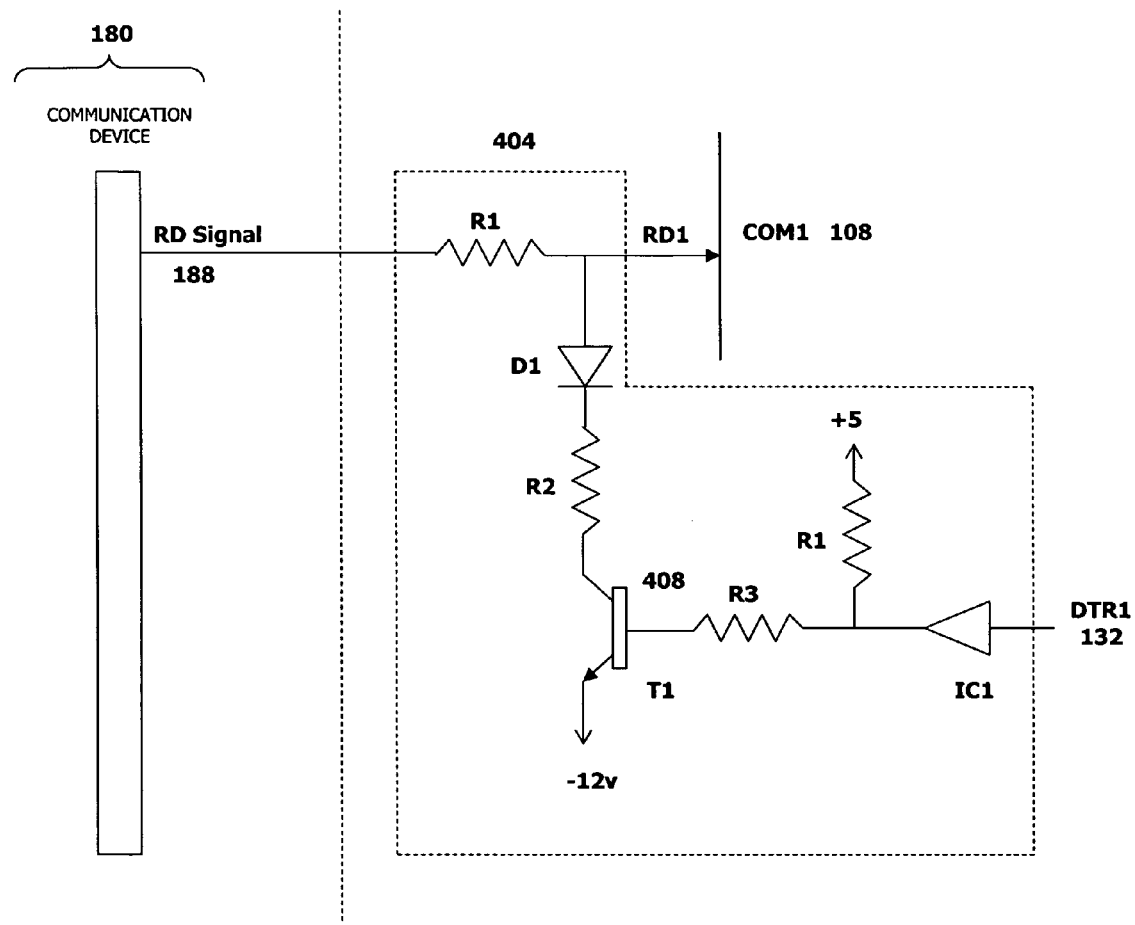
FIG. 4 illustrates one of the possible active isolation circuits that isolate a port based on a signal created at the communication system but do so on the +12v/−12v side of the level of converters.

As shown in FIG. 4, another class of embodiments would replace the active isolation circuit 204 with an active isolation circuit 404 placed between the external communication device 180 and the COM port (108). When DTR1 132 is 5vdc (DTR=not ready or isolated), the RD1 signal will be pulled to −12vdc through transistor T1 (408).

For the convenience of the reader, applicant has added a number of topic headings to make the internal organization of this specification apparent and to facilitate location of certain discussions. These topic headings are merely convenient aids and not limitations on the text found within that particular topic.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

We claim:

1. A communication system comprising:
    a CPU;
    a first communication port in data communication with the CPU and adapted to communicate with external communication devices;
    at least a first data communication line adapted to convey a signal received from a first remote communication device at the first communication port, the signal conveyed towards the CPU for the purpose of initiating a request to interact with the CPU;
    a second communication port in data communication with the CPU;
    the CPU adapted to receive a command over the second communication port to isolate at least a first communication port under exclusive control of the second communication port for allowing subsequent commands provided to the CPU through the second communication port to be performed during a period of exclusive control of the CPU through the second communication port;
    the CPU adapted to respond to the command through the second communication port to isolate all other communications thereto by providing an output on at least one isolation signal communication line to at least a first active isolation circuit;
    the first active isolation circuit adapted to respond to the output on the at least one isolation signal communication line to prevent any communication attempting to initiate a request to interact with the CPU from being conveyed through the at least a first communication port and a first data communication line thereof to the CPU;
    whereby the command to isolate causes the CPU to prevent any communication conveyed through the at least a first communication port and a first data communication line thereof, and any other communication ports and communication lines, from being conveyed.

2. The communication system of claim 1 wherein the output on the at least one isolation signal communication line is conveyed to both the first active isolation circuit and to the first communication port to provide notice to any communication device connected to the at least a first communication port that the CPU is not ready for requests to interact with the CPU.

3. The communication system of claim 2 wherein the communication system further comprises:
    a third communication port in data communication with the CPU and adapted to communicate with external communication devices;
    a third data communication line adapted to convey a signal received from a third remote communication device at the third communication port, the signal conveyed towards the CPU for the purpose of initiating a request to interact with the CPU;
and the output on the at least one isolation signal communication line comprises:
    an output on the first isolation signal communication line which is conveyed to both the first active isolation circuit and to the at least a first communication port to provide notice to any communication device connected to the at least a first communication port that the CPU is not ready for requests to interact with the CPU; and
    an output on the third isolation signal communication line which is conveyed to both the third active isolation circuit and to the third communication port to provide notice to any communication device connected to the third communication port that the CPU is not ready for requests to interact with the CPU;
whereby the command to isolate causes the CPU to:
    prevent any communication conveyed through the at least a first communication port and the at least a first data communication line from conveying a signal to the CPU initiating a request to interact with the CPU and;
    prevent any communication conveyed through the third communication port and third data communication line from conveying a signal to the CPU initiating a request to interact with the CPU.

4. The communication system of claim 1 wherein the CPU is further adapted to receive a command from the second communication port reversing the command to isolate;

the CPU being adapted to respond to the command to reverse the command to isolate by changing the output on the at least one isolation signal communication line to the first active isolation circuit; and the first active isolation circuit responding to the changed output by ending the isolation of the at least a first communication port by allowing subsequent communication conveyed through the first communication port and the at least a first data communication line to convey a signal to the CPU initiating a request to interact with the CPU.

5. The communication system of claim 1 further comprising:

a third data communication port in data communication with the CPU and adapted to communicate with external communication devices;

a third data communication line adapted to convey a signal received from a third remote communication device at the third communication port, the signal conveyed to the CPU for the purpose of initiating a request to interact with the CPU;

a second active isolation circuit adapted to isolate the third data communication port;

wherein, the output on at least one isolation signal communication line is provided to a single isolation signal communication line in data communication with the first active isolation circuit and the second active isolation circuit such that one output from the CPU can isolate the first communication port and the third communication port.

6. The communication system of claim 1, wherein the output from the CPU provided to the first active isolation circuit causes the first active isolation circuit to allow subsequent communication conveyed through the at least a first communication port and the at least a first data communication line to convey a signal to the CPU initiating a request to interact with the CPU.

7. The communication system of claim 1, wherein the output from the CPU provided to the first active isolation circuit causes the first active isolation circuit to block subsequent communication conveyed through the at least a first communication port and the at least a first data communication line to block any attempt to initiate a request to interact with the CPU.

* * * * *